United States Patent [19]

Khazai et al.

[11] Patent Number: 5,169,832
[45] Date of Patent: *Dec. 8, 1992

[54] SYNTHESIS OF REFRACTORY METAL BORIDE POWDERS OF PREDETERMINED PARTICLE SIZE

[75] Inventors: Bijan Khazai; William G. Moore, both of Midland, Mich.

[73] Assignee: The Dow Chemical Company, Midland, Mich.

[*] Notice: The portion of the term of this patent subsequent to Apr. 28, 2009 has been disclaimed.

[21] Appl. No.: 217,926

[22] Filed: Jul. 12, 1988

[51] Int. Cl.$^5$ .............................................. C04B 35/52
[52] U.S. Cl. ...................................... 501/87; 501/93; 501/96; 264/56; 264/65; 423/289
[58] Field of Search ............... 501/87, 96, 93; 264/56, 264/65; 423/289

[56] References Cited

U.S. PATENT DOCUMENTS

| | | | |
|---|---|---|---|
| 2,613,154 | 10/1952 | Montgomery | 501/87 |
| 2,957,754 | 10/1960 | NIcholson | 23/204 |
| 3,041,142 | 6/1962 | Van Der Beck et al. | 23/204 |
| 3,096,149 | 7/1963 | Gruber | |
| 3,244,482 | 4/1966 | Culbertson et al. | 23/204 |
| 3,328,127 | 6/1967 | Byrns | 23/204 |
| 3,351,429 | 11/1967 | Timms et al. | 23/204 |
| 3,367,743 | 2/1968 | Matchen | 23/204 |
| 4,282,195 | 8/1981 | Hoekje | 423/289 |
| 4,379,852 | 4/1983 | Watanabe et al. | 501/87 |
| 4,503,021 | 3/1985 | Brynestad et al. | 423/297 |
| 4,670,408 | 6/1987 | Petzon et al. | 501/87 |

FOREIGN PATENT DOCUMENTS 115702 8/1984 European Pat. Off. .
761311 9/1954 United Kingdom .

OTHER PUBLICATIONS

Zavitsanos, et al. "Synthesis of Titanium Dibonide by a self-propagating system", Ceram. Eng. Sci. Proc. pp. 624–633.

McCauley, et al. "Simultaneous preparation and self sintering of materials in the system Ti-B-C", Ceram. Eng. Sci. Proc. pp. 538–554.

Brynestad et al., *Synthesis of Submicron Titanium Diboride Powders*, 19 High Temperature Science 41 (1985).

Kim et al., *TiB$_2$ Power Production for Engineered Ceramics*, 6 Ceram. Sci. Proc. 1313 (1985).

*Primary Examiner*—Olik Chaudhuri
*Assistant Examiner*—Andrew Griffis

[57] ABSTRACT

Metal boride powders can be produced with a predetermined particle size by controlling reaction conditions. The metal boride powder is produced by reacting a solid boron source, a metal source and a reductant under conditions sufficient to produce a metal boride powder with a particle size correlating to that of the solid boron source. The reaction is preferably stopped after the formation of products but before any appreciable crystal growth occurs.

16 Claims, No Drawings

SYNTHESIS OF REFRACTORY METAL BORIDE POWDERS OF PREDETERMINED PARTICLE SIZE

BACKGROUND OF THE INVENTION

This invention relates to the preparation of refractory metal boride powders, particularly to the preparation of such powders with a predetermined particle size.

Refractory metal boride compounds are important industrial materials. They possess high melting points, high hardnesses, low electrical resistivities, high thermal conductivities, and moderately low specific gravities. In addition, several of these compounds are resistant to oxidation and are chemically inert in many harsh, corrosive environments. Because of the above properties, these compounds are used in cutting and grinding tools, electrodes in harsh environments, and armor plating.

Boride compounds are often produced as fine powders, and dense products can be made from these powders using known forming operations, for example, hot pressing or sintering processes. Powders which are best suited for such processes are very small particles with high surface energies which are capable of being consolidated at high temperatures.

There are a number of methods of producing boride powders, and these manufacturing processes include direct combination of a metal or its hydride with boron at high temperatures, reduction of a metal oxide with boron or a mixture of boron and carbon, reaction of a boron halide with a metal or metal oxide and hydrogen, and fused salt electrolysis of the metal oxide with a source of boron oxide. However, the most widely used method is the carbothermal reduction described, for example, in U.S. Pat. No. 2,957,754 and U.S. Pat. No. 3,328,127. This method involves the reaction of titanium dioxide with boron oxide or boron carbide in the presence of carbon at high temperatures. While this method is widely used, it has two major drawbacks. First, the use of high temperature leads to the formation of titanium diboride with very large grain sizes. Second, control of the particle size is difficult because the product crystallizes rapidly and these crystals grow rapidly under the reaction conditions. These particles then require size reduction before use in most forming operations, which results in (1) impurities from the size reduction process, (2) irregularly shaped and fractured particles, and (3) a very large particle size distribution.

In many applications, particularly those involving sintering or hot pressing operations, the boride compounds should be of controlled and, preferably, submicron size. One method of producing such particles is through a gas phase reaction described, for example, in U.S. Pat. No. 4,503,021. In this method, gaseous boron halide is reacted with titanium halide and hydrogen to produce titanium diboride and hydrogen halide. Although some starting reactants may, in some cases, be solid, the boron halide must be in the gas phase.

In view of the above limitations in the present methods of producing metal boride compounds, it is clear that new processes are desirable to allow for more flexible manufacture. A method is especially desirable which would allow the manufacture of boride powders of a predetermined particle size, ranging from submicron-sized up to a diameter of about 50 microns.

SUMMARY OF THE INVENTION

The present invention is a method of producing boride compounds comprising reacting a solid boron source, a metal source and a reductant under conditions sufficient to produce a metal boride powder. The reaction is carried out in a manner such that the particle size of the metal boride product correlates to that of the solid boron source.

The invention allows the synthesis of metal boride powder of predetermined size, i.e., a size which correlates to the particle size of the boron source. It also allows the production of high quality ceramic parts. These ceramic parts can be produced from the metal boride powders by forming operations such as hot pressing or sintering processes.

DESCRIPTION OF THE INVENTION

The boron source is an important reactant in the process, as it is a significant factor in predetermining product size. The boron source can be any particulate powder, including for example, forms of boron carbide, boron nitride, amorphous boron, or any combination of these. In a preferred embodiment the boron source is a form of boron carbide which includes boron-rich boron carbide and carbon-rich boron carbide. The average particle size and distribution of the boron source is preferably of the same order of magnitude desired for the metal boride product.

As used herein in the specification and the claims, the term "metal source" refers to pure metals and metal compounds which contain a metal, reaction of which with boron to produce a metal boride is energetically favorable. The metal is preferably any element from the groups IIIA, IVA, IIIB, IVB, VB, VIB and VIII, as well as the lanthanide and actinide series of the Periodic Table of the Elements as published in Weast, CRC Handbook of Chemistry and Physics (65th Ed., 2d printing 1984). These metals include especially titanium, zirconium, hafnium, vanadium, niobium, tantalum, chromium, molybdenum, tungsten, cobalt, aluminum, silicon, yttrium, lanthanum, uranium and europium. The compound can be an oxide, carbide, halide, nitride, hydride or hydroxide of a metal. The preferred compound is the oxide of the metal. The metal source can be any fine powder of the selected compound, for example, commercially available pigment grade $TiO_2$. While the particle size of the metal source does not affect the size of the product, metal source particle sizes which are too large would inhibit complete and uniform reaction. Therefore, the preferred particle size of the metal source is less than about 50 microns.

The reductant can be hydrogen, carbon, compounds of carbon, or any combination of these which will reduce the metal source used in the process. Preferably, the reductant is carbon, hydrogen or mixture of carbon and hydrogen. One skilled in the art will know to adjust the reactant proportions according to the stoichiometry of the reaction.

The carbothermal reduction takes place under a vacuum or an atmosphere of a reducing gas, inert gas, reaction compatible gas (one which takes part in the reaction) or any combination of these gases. In a preferred embodiment, the atmosphere is a flowing inert gas. In a more preferred embodiment, the flowing inert gas is argon.

The skilled practitioner will realize that the choice of the boron source, metal source, reductant, and atmosphere can result in impurities in the product metal borides. It is generally preferred to select the reactants and atmosphere to avoid unwanted contaminants.

A preferred embodiment of the invention proceeds according to the following formula:

$$2TiO_2 + B_4C + 3C \rightarrow 2TiB_2 + 4CO.$$

The reactant proportions are determined by the stoichiometry of the reaction based especially on the boron source. Modifications of the representative reaction to accommodate the use of other metal or boron sources will be known to those skilled in the art. For example, the use of the metal chloride would require the use of hydrogen, in place of carbon, as a reductant. The use of a hydrogen atmosphere would require lowering the amount of carbon in the reaction as the hydrogen would supplement carbon as a reductant. The use of a reaction product gas atmosphere such as carbon monoxide would require the modification of reactant proportions because CO can act as a reductant. The varying of reactant proportions and reactants and reductant can also control the amount of contaminants in the product powder. Thus, those skilled in the art will be able to control the reaction by varying the above reaction and reactant materials.

The reaction occurs in a vessel of any configuration which does not substantially take part in the reaction. It proceeds under reaction conditions favorable to the reduction of the metal source.

The process of the invention preferably occurs at elevated temperatures. These temperatures preferably range up to about two-thirds of the melting point of the boride compound. In a preferred embodiment the reaction occurs at a temperature at which the reaction rate exceeds the recrystallization rate, and in a more preferred embodiment, the reaction occurs at a temperature at which the reaction rate substantially exceeds the recrystallization rate. "Recrystallization" as used herein in the specification and the claims refers to the growth of product metal boride particles after the conversion of boron source particles to the metal boride product. This temperature is usually well below the sintering temperature of the metal product. However, it will be realized by those skilled in the art, that as time and temperature are interrelated parameters, adjustments to these parameters will be necessary when either is substantially varied. For example, in the carbothermal reduction of titanium dioxide in the presence of carbon and boron carbide, the melting point of the titanium diboride product is about 3000° C., its preferred sintering temperature is from about 2000° C. to about 2100° C. approximately two-thirds of its melting point. Whereas, the most preferred reaction temperature is from about 1600° C. to about 1750° C.

The reaction time is determined by the kinetics of the reaction and subsequent recrystallization of the product. In a preferred embodiment, the reaction time is less than that required to allow significant grain growth, usually up to about 2 hours. In a more preferred embodiment of the invention, the reaction time is from about 10 to about 20 minutes.

The reaction mixture can be prepared by any method provided the preparation method results in the intimate contact of the reactant powders. Preferably, the reactants are in a homogeneous mix, i.e., the reactants are mixed such that there are no discrete regions of individual reactants of greater than 50 microns. In a more preferred embodiment, the discrete areas of individual reactants do not exceed 10 microns. The preparation can include dry or wet mixing of solid reactants. If wet mixing is used, the reactants are preferably dried to a powder before entering the reaction chamber. If dry mixing is used, it is preferred that the milling media used are compounds of carbon. This limits impurities introduced into the reaction mix to those which will not have a deleterious effect on the final metal boride product.

In the preferred embodiment of the invention, the reactants are mixed in a wet form, dried and then gently crushed into a fine powder. The powder is then preferably placed in graphite boats. The depth of the powder in these boats is preferred to be such that all of the powder reacts uniformly, without a significant temperature gradient across the reactant mix. This results in a more homogeneous product. In the preferred embodiment of the invention, the reaction powder depth in these graphite boats is less than one inch. In the most preferred embodiment, the reactant powder depth is less than one-half inch. The graphite boats are then placed in a conventional horizontal furnace, and the reaction is allowed to go to completion at elevated temperatures. While the above is a preferred method, those skilled in the art will know that other preparation methods, reactor vessels, and reactant handling methods can be used and are contemplated by this invention.

The resulting reaction product is preferably composed of particles which are well-developed uniaxial crystals. The product particle size correlates to the particle size of the reactant boron compound. This means that the average particle size and size distribution of the reaction product are of the same order of magnitude as those of the reactant boron source.

The resulting boride compounds can be further processed into densified ceramic parts. They can be used in producing uniform, fine grained ceramics with densities approaching theoretical. For example, molded pieces for sintering operations made from the invention's powder preferably have high green densities which results in sintered products having low porosity. These products are, therefore, useful in industrial applications.

The following examples are set forth to illustrate the invention and should not be construed to limit its scope in any way. Unless stated otherwise, all parts and percentages are given by weight.

EXAMPLE 1

Titanium dioxide (35.06 g); boron carbide (12.56 g) with particle size of about 0.2 micron and assaying as 22.18 percent carbon, 75.69 percent boron, 1.02 percent nitrogen, and 1.11 percent oxygen: and carbon (7.84 g) are made into an aqueous slurry under high agitation and heated to a thick paste. The wet mass is subsequently dried overnight at 105° C. and the resulting cake gently crushed. The powder obtained at this stage weighs 54.85 g and the yield of $TiB_2$ is expected to be 55 percent.

About 14.9 g of this powder precursor is placed inside a graphite crucible and the crucible placed in an induction furnace. The chamber is evacuated and subsequently kept under positive pressure of flowing argon gas. The sample is heated to about 1600° C. over a period of approximately 30 minutes with the reaction being initiated at about 1250° C. as observed by the onset of gas evolution. Reaction is allowed to continue for 15 minutes at this temperature after which time power to the furnace is turned off and the sample is allowed to cool under argon gas. The product is obtained as a black powder weighing 8.01 g. An X-ray diffraction pattern of the sample shows essentially a $TiB_2$ phase which is made up of well-formed crystallites of submicron size as observed by examination of scanning electron micrographs. The particles, which are about 0.5 micron in diameter, exhibit a narrow size distribution.

EXAMPLE 2

Titanium dioxide (42.9 g); boron carbide (15.35 g) having a size range of 2 to 10 microns and assaying as 22.32 percent carbon, 77.42 percent boron, 0.005 percent nitrogen and 0.25 percent oxygen; and carbon (9.03 g) are mixed and dried as before. The precursor recovered weighs 66.67 g and a yield of 55.47 percent of $TiB_2$ is expected.

A 15.13-g sample of this powder is heated to about 1600° C. in an induction furnace and maintained at temperature for 10 minutes. The entire process is carried out under flowing argon gas after an initial evacuation. The sample is then allowed to cool in the reactor and the product is obtained as a black powder weighing 8.28 g. Examination of the sample by X-ray diffractometry indicates essentially $TiB_2$ phase. Further evaluation of the sample by scanning electron microscopy indicates particles substantially ranging in size between 2 and 10 microns.

The comparison of the above examples indicates the correlation of the particle size between reactant boron carbide and the product metal boride.

What is claimed is:

1. A method of producing a metal boride powder consisting essentially of reacting a solid boron source, a metal source, and a reductant under conditions sufficient to produce a metal boride powder with a particle size that correlates to that of solid boron source, the conditions including a temperature from about 1600° C. up to about 1750° C.

2. The method of claim 1 in which the boron source is a form of boron carbide.

3. The method of claim 1 in which the metal source contains a metal from the group consisting of titanium, zirconium, hafnium, vanadium, niobium, tantalum, chromium, molybdenum, tungsten, cobalt, aluminum, silicon, yttrium, lanthanum, uranium and europium.

4. The method of claim 3 in which the metal source is from the group consisting of metal oxides, metal halides, metal carbides, metal nitrides, metal hydrides, metal hydroxides and combinations thereof.

5. The method of claim 4 in which the metal source is a metal oxide.

6. The method of claim 5 in which the metal source is $TiO_2$.

7. The method of claim 1 in which the reductant is hydrogen, carbon, a compound of carbon or a combination of these.

8. The method of claim 1 in which the reaction is carried out at a temperature up to about two-thirds of the melting point of the metal boride compound.

9. The method of claim 8 in which the reaction is carried out at a temperature at which formation of the metal boride powder proceeds at a rate which exceeds the rate at which metal boride powder particles grow via recrystallization.

10. The method of claim 1 in which the reaction is carried out for a time up to about 2 hours.

11. The method of claim 10 in which the reaction is carried out for a time from about 10 minutes to about 20 minutes.

12. The method of claim 1 in which the reaction is carried out under an atmosphere of an inert gas, a reaction compatible gas or any combination of these gases.

13. The method of claim 12 in which the atmosphere is an inert gas.

14. The method of claim 13 in which the inert gas is argon.

15. A method of producing titanium diboride consisting essentially of contacting as reactants boron carbide, titanium dioxide and carbon under reaction conditions such that titanium diboride is produced having a particle size correlating to that of the boron carbide.

16. The method of claim 15 is which the reaction is carried out under an atmosphere of flowing argon gas.

* * * * *